C. DONASON.
TRACTOR BELT WHEEL.
APPLICATION FILED JAN. 24, 1917.
1,324,804.
Patented Dec. 16, 1919.
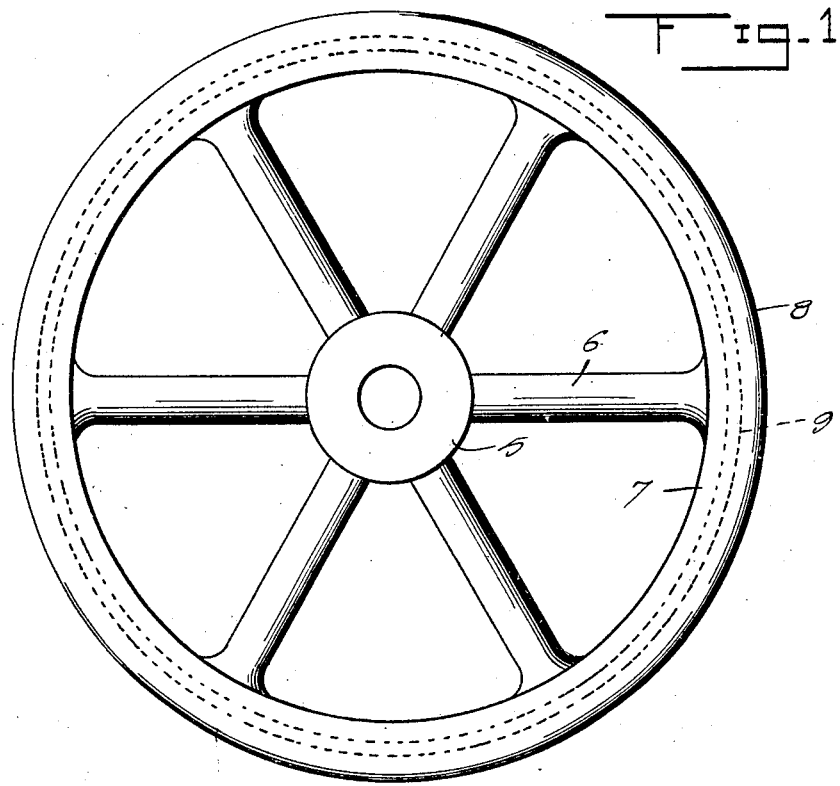
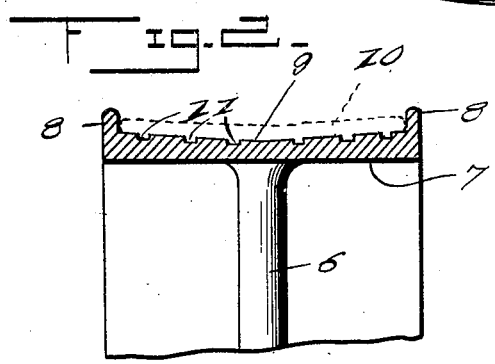

UNITED STATES PATENT OFFICE.

CARL DONASON, OF MAGNON, ILLINOIS.

TRACTOR BELT-WHEEL.

1,324,804.  Specification of Letters Patent.  Patented Dec. 16, 1919.

Application filed January 24, 1917. Serial No. 144,171.

*To all whom it may concern:*

Be it known that I, CARL DONASON, a citizen of the United States, residing at Magnon, in the county of Knox and State of Illinois, have invented certain new and useful Improvements in Tractor Belt-Wheels; and I do hereby declare the following to be a full, clear, and exact description of the invention, such as will enable others skilled in the art to which it appertains to make and use the same.

This invention has for its object to provide an improved pulley having the outer surface of the rim so shaped as to prevent the belt from slipping laterally therefrom.

With this and other objects in view, the invention consists in the novel construction, combination and arrangement of parts as will be hereinafter specifically described, claimed and illustrated in the accompanying drawings, in which—

Figure 1 represents a side elevation of the improved pulley.

Fig. 2 represents a fragmentary transverse sectional view through the rim of the pulley.

Referring to the drawing in detail, wherein similar reference numerals designate corresponding parts throughout the several views, the numeral 5 indicates the hub of the improved pulley which is provided with a plurality of radiating spokes 6 having connection at their outer terminals with the belt supporting rim 7.

The opposed edges of the rim 7 are formed with outwardly projecting parallel flanges 8 constituting guides for the flexible belt which is trained over the pulley and designed to prevent the belt from slipping therefrom. The outer surface of the rim 7 is inclined outwardly from the center toward the flanges 8 thereby presenting a concaved surface 9, in cross section to receive the belt 10, shown in dotted lines in Fig. 2, positioned upon the pulley rim. The oppositely inclined surfaces 9 of the pulley rim are formed with spaced annular grooves 11 designed to firmly grip the flexible belt 10 and prevent it from slipping laterally from the pulley rim.

What I claim is:—

A pulley including a hub, spokes radiating therefrom, a rim carried by said spokes and having its periphery inclined upwardly in opposite directions from a central point, said rim also having a plurality of spaced annular grooves normally tending to prevent lateral movement and slipping of a belt, said rim having means to positively prevent lateral movement of the belt.

In testimony whereof I affix my signature in presence of two witnesses.

CARL DONASON.

Witnesses:
 CONRAD L. SLUSHER,
 WALTER E. COLEGROVE.